(12) United States Patent
Fox et al.

(10) Patent No.: US 9,544,017 B2
(45) Date of Patent: Jan. 10, 2017

(54) POWERLINE COMMUNICATED LOAD CONTROL

(71) Applicant: POWERLINE LOAD CONTROL, New Rochelle, NY (US)

(72) Inventors: Christopher Fox, San Antonio, TX (US); Peter R. Pettler, Miami, FL (US)

(73) Assignee: Powerline Load Control LLC, New Rochelle, NY (US)

( * ) Notice: Subject to any disclaimer, the term of this patent is extended or adjusted under 35 U.S.C. 154(b) by 134 days.

(21) Appl. No.: 14/193,405

(22) Filed: Feb. 28, 2014

(65) Prior Publication Data

US 2014/0175866 A1   Jun. 26, 2014

Related U.S. Application Data

(63) Continuation of application No. 13/559,241, filed on Jul. 26, 2012, now Pat. No. 8,716,882.

(60) Provisional application No. 61/574,073, filed on Jul. 28, 2011.

(51) Int. Cl.

| H04B 3/54 | (2006.01) |
|---|---|
| H04L 27/02 | (2006.01) |
| H04L 27/04 | (2006.01) |
| H04L 27/06 | (2006.01) |

(52) U.S. Cl.
CPC ............. *H04B 3/542* (2013.01); *H04B 3/54* (2013.01); *H04L 27/02* (2013.01); *H04L 27/04* (2013.01); *H04L 27/06* (2013.01); *H04B 2203/5458* (2013.01)

(58) Field of Classification Search
CPC .......... H04L 27/02; H04L 27/04; H04L 27/06
USPC ........................................................ 307/2–3
See application file for complete search history.

(56) References Cited

U.S. PATENT DOCUMENTS

| 3,944,743 A | 3/1976 | Criglar et al. |
| 4,157,535 A | 6/1979 | Balkanli |
| 5,032,829 A * | 7/1991 | Shoji ................... G09G 3/30 345/212 |

(Continued)

FOREIGN PATENT DOCUMENTS

JP   2010-205733 A   9/2010

OTHER PUBLICATIONS

Konnex PL132—Power-Line-Communication using the CENELEC-C-Band, 2000, 2003, DOMOLOGIC Home Automation GmbH.

*Primary Examiner* — Adi Amrany
(74) *Attorney, Agent, or Firm* — Brian J. Colandreo; Michael T. Abramson; Holland & Knight LLP

(57) ABSTRACT

A system for transmitting communication signals, the system comprising an injector circuit connected to a powered circuit conductor and configured to modulate a power signal with a direct current voltage offset, the direct current voltage offset being within a range that causes approximately 1 percent or less total harmonic distortion of the power signal; and a decoder connected to the powered circuit conductor and a load, the decoder configured to demodulate the direct current voltage offset to control the load. A method for transmitting communication signals, the method comprising modulating a power signal on a powered circuit conductor with a direct current voltage offset, the direct current voltage offset being within a range that causes approximately 1 percent or less total harmonic distortion of the power signal; and demodulating the direct current voltage offset to control a load.

22 Claims, 14 Drawing Sheets

(56) References Cited

U.S. PATENT DOCUMENTS

| | | |
|---|---|---|
| 5,515,038 A | 5/1996 | Smith |
| 6,181,082 B1 | 1/2001 | Moisin |
| 6,218,787 B1 | 4/2001 | Murcko et al. |
| 6,377,163 B1 | 4/2002 | Deller et al. |
| 6,734,784 B1 | 5/2004 | Lester |
| 6,784,790 B1 | 8/2004 | Lester |
| 7,023,324 B2 | 4/2006 | Kodama et al. |
| 7,183,900 B2 | 2/2007 | Sullivan |
| 7,391,168 B1 | 6/2008 | Dernovsek et al. |
| 7,521,900 B2 | 4/2009 | Duff, Jr. |
| 7,541,941 B2 | 6/2009 | Bogolea et al. |
| 7,639,598 B2 | 12/2009 | Sovenyi |
| 7,688,183 B2 | 3/2010 | Lester |
| RE41,739 E | 9/2010 | Lester |
| 7,912,139 B2 | 3/2011 | Kodama et al. |
| 7,982,633 B2 | 7/2011 | Booker et al. |
| 8,006,105 B1 * | 8/2011 | Sivertsen ................. G06F 1/16 174/520 |
| 8,051,309 B2 | 11/2011 | Kashi et al. |
| 8,068,014 B2 | 11/2011 | Steiner et al. |
| 8,068,937 B2 | 11/2011 | Eaves |
| 8,107,516 B2 | 1/2012 | Fornage |
| 8,116,714 B2 | 2/2012 | Black |
| 8,130,084 B2 | 3/2012 | Cagno et al. |
| 8,138,622 B2 | 3/2012 | Layton et al. |
| 8,208,235 B2 | 6/2012 | Orchowski |
| 2002/0128009 A1 | 9/2002 | Boch et al. |
| 2003/0189495 A1 | 10/2003 | Pettler et al. |
| 2006/0284728 A1 | 12/2006 | Rubinstein et al. |
| 2007/0273335 A1 | 11/2007 | Duff |
| 2008/0157939 A1 * | 7/2008 | Sutardja ............. H05B 37/0254 340/12.33 |
| 2008/0191637 A1 | 8/2008 | Pettler |
| 2008/0258882 A1 | 10/2008 | Lester et al. |
| 2008/0278295 A1 | 11/2008 | McKenzie et al. |
| 2008/0309263 A1 * | 12/2008 | Wen .................... H02H 7/0851 318/266 |
| 2009/0039854 A1 | 2/2009 | Blakeley |
| 2011/0016063 A1 | 1/2011 | Pollack et al. |
| 2011/0032085 A1 | 2/2011 | Maros et al. |
| 2011/0043124 A1 * | 2/2011 | Johnston ............ H05B 37/0263 315/250 |
| 2011/0222595 A1 * | 9/2011 | Choi ..................... H04B 3/548 375/238 |
| 2012/0091915 A1 | 4/2012 | Ilyes et al. |
| 2012/0092141 A1 * | 4/2012 | Ichihara .................. H04B 3/54 340/12.32 |

* cited by examiner

POWERLINE COMMUNICATED LOAD CONTROL

CROSS REFERENCE

This application is a continuation of application Ser. No. 13/559,241 filed on Jul. 26, 2012 which claims priority to U.S. Provisional Application No. 61/574,073, entitled POWERLINE COMMUNICATED LOAD CONTROL and filed Jul. 28, 2011, the contents of which are incorporated herein by reference into the present application.

FIELD OF THE INVENTION

The invention relates to the technical of communicating control signals over an AC supply line.

BACKGROUND

Throughout the civilized world there is a growing need to make more efficient use of the supply of electrical power. With this increasing interest in energy conservation, methods for centralized control of electrical loads that are uncomplicated and cost-effective to install are becoming more important. Using lighting loads as an example, one effective way to reduce energy consumption is to use dimmable lighting systems. Newer lighting systems control light output and energy consumption by adjustment of lighting levels throughout the day, reducing energy usage when light is not needed.

The growing imposition of time-of-day dependent utility rates presents another important economic rationale for curtailing consumption to avoid onerous penalties for excessive peak loads. As electric power generation capacity becomes less able to meet periods of excessive demand, consumers are becoming more accepting of utility provisions to automatically reduce load demands rather than experience a brownout.

Load control systems utilizing separate dedicated wiring have been widely employed for energy and comfort management in new commercial buildings. However, costs of adding the required control wiring usually prohibits such load control upgrades to be retrofit to existing buildings. A cost-effective wireless system would, however, mitigate the complications of the routing of new wiring that would be required.

Historically, remote load management was implemented through the use of physical control wires that interconnected an automatic or manual controller with each load (e.g. lighting fixture) under its control. However, when applied to lighting control, the requirement for new dedicated control wiring proved to be excessively costly in those instances where lighting controls were to be added after the original building construction. And, even in the case of new construction, attractive reduction of installation costs can often be realized by utilizing the power wiring infrastructure as a communications medium for environmental building control signals.

Due to the considerable quantity of lighting fixtures that are employed in most buildings, it is important that the per-fixture cost of dimming be reduced as much as possible. To satisfy this requirement, several wireless control communication techniques have been put into practice. One such approach uses dimming signals that are transmitted by phase-cut manipulation of the power supplied to specially equipped fixtures on an existing lighting branch. For example, Philips Advance Transformer Mark X® and Lutron TuWire® ballasts use phase cut manipulation. Typically, wall-mounted dimmers, such as those usually employed for incandescent loads, are then used for manual dimming control with phase cut manipulation. This method has proved very convenient for small areas, but not for wide application because power quality is incrementally reduced by each fixture under such control.

There has been a longstanding need for a reliable, low-cost means of communicating load management commands in commercial applications. Use of the existing power lines for this purpose always seemed to offer a very attractive solution. The traditional approach to meet this goal attempted to use a variant of power line carrier control ("PLC"). PLC involves superimposing a coded carrier frequency in the range 100 kHz to 2 MHz or a timed burst of noise onto the AC power line. Systems employing PLC have seen widespread use in residential lighting applications, but limited penetration in commercial lighting applications. Osram-Sylvania introduced a commercial PLC control system for demand response applications, under the designation of PowerSHED®. However, the system has yet to achieve significant market acceptance.

Still another general approach to remote load control uses radio frequency signaling. For this approach, control messages in the form of radio frequency signals are transmitted via a mesh network, where they are handed off sequentially though low-power transceivers located at each control point. However, a low-cost implementation of this approach capable of communicating control messages has been illusive.

SUMMARY OF THE INVENTION

The present invention allows load control signals to be sent over the same wiring that is used to provide AC power to the load. This is particularly applicable to remote lighting control, where the addition of dedicated wiring for lighting control can be costly and time consuming. By using the existing AC supply wiring, the changeover from conventional lighting to is greatly simplified and installation costs are significantly reduced.

Although the controlled diming of light fixtures has been described in the preceding paragraphs as a typical example of an application of powerline communicated load control, many other applications are anticipated. Examples include the management of heating, ventilation and air-conditioning (HVAC) loads, window shade controls, appliance plug load controls, light emitting diode color mixing, and hot water heating.

In one form, the present disclosure provides a system for transmitting communication signals over a powered circuit conductor. The system comprises an injector circuit connected to a powered circuit conductor and configured to modulate a power signal with a direct current voltage asymmetrically resulting in a DC offset, the direct current voltage offset being within a range that causes approximately 1 percent or less total harmonic distortion of the power signal; and a decoder connected to the powered circuit conductor and a load, the decoder configured to demodulate the direct current voltage offset to control the load.

In another form, the present disclosure provides a method for transmitting communication signals over a powered circuit conductor. The method comprises modulating a power signal on a powered circuit conductor with a direct current voltage asymmetrically resulting in a DC offset, the direct current voltage offset being within a range that causes approximately 1 percent or less total harmonic distortion of the power signal; and demodulating the direct current voltage offset to control a load.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION

The present invention provides a new system and method for communicating load control signals on existing branch power lines. Known systems for sending control signals over power lines employ the injection of carrier current signals having a frequency of 100 kHz and higher. These relatively high frequency signals are difficult to propagate over 50 or 60 Hz power lines with their associated loads. One aspect of the present invention is to utilize low-frequency supply voltage as a carrier frequency and then modulate the supply voltage signal in accordance with the information to be communicated. Although this approach provides a communication bandwidth of only a fraction of a cycle per second, such speed is adequate for the intended load management application. This technique is referred to as Power line Communicated Load Control ("PCLC").

PCLC can be used for on/off control of incandescent, fluorescent, light emitting diode ("LED"), high intensity discharge ("HID") and induction lighting sources. It can also be used to manipulate the dimming level of any of the above light sources that have been equipped for dimming. Although the preferred embodiments will be described in the context of lighting in commercial buildings, it should be understood that PCLC can be applied to all types of fixed electrical loads.

The PCLC system preferably performs at least two load control actions; load shave and load shed. Load shave refers to trimming non-essential components of the total load during periods of the day when the applicable electric rate is at a premium, or during intervals when excessive consumption can trigger an onerous rate escalation for exceeding a prescribed level of peak demand. Load shed refers to a response to an indication from the serving utility that it will be experiencing a period of critical capacity shortage during specified upcoming intervals. Such a response may be elective, in order to help avoid a system-wide "brown out" or may be mandatory if the consumer has previously agreed to such a response in return for a favorable billing rate.

PCLC has a number of benefits when applied to lighting applications. First, PCLC produces minimal disturbances of the AC power quality by maintaining high power factor and low harmonic distortion of the AC power line current. Second, PCLC is capable of sending commands down a power line in such a way that they are uniquely confined to the downstream physical limits of that power line. This prevents any undesired command signal bleed onto other lighting branches. Finally, PCLC represents a cost effective way to implement remote lighting control in existing construction that is already not fitted with separate dedicated wiring for lighting control.

Figure 1:
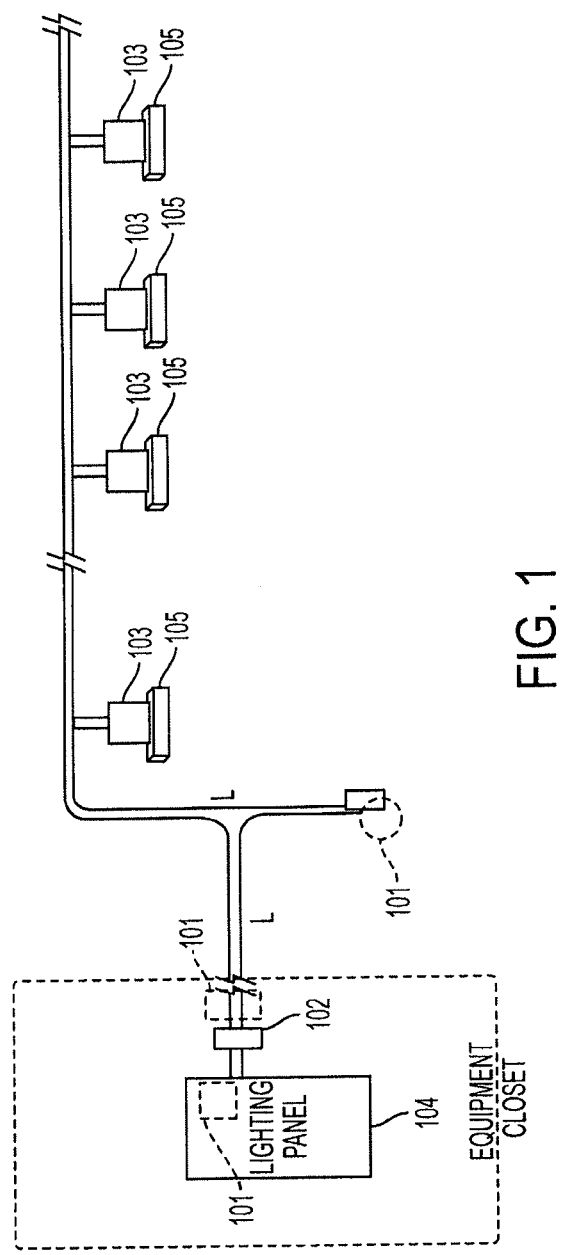
FIG. 1 is a block diagram for installation of the power line communicated load control system in a single lighting branch.

FIG. 1 is a block diagram for PCLC as installed on a single lighting branch. As seen in FIG. 1, PCLC is preferably comprised of an injector 101, a system control 102, and a decoder 103. When load control is desired, the system control 102 connects the injector 101 to the network in order to introduce a voltage asymmetry on the AC line conductor. When no signaling is in process, the injector 101 is disconnected from the network so as to be lossless. By enabling the asymmetry condition in an on/off pattern, coded control signals can be sent down the AC line conductor. The voltage asymmetry on the AC line conductor manifests itself as the presence of a DC bias or offset that is within a range that causes approximately 1% or less total harmonic distortion of the power signal. Preferably, the DC offset is within the rage of 1 to 5 volts. Downstream loads are equipped with a decoder 103 to detect the signals introduced by the injector 101 onto the AC line conductor. The decoder 103 decodes the voltage asymmetry into the desired command for use by the load.

The injector 101 is installed in series with the AC line conductor that supplies the controlled load. Because the injector 101 is installed in series with the AC line conductor, the AC line conductor must be opened for installation. The injector 101 is installed at a point on the AC line conductor that is in series with all the loads over which PCLC is to exert control. In one aspect, the injector could be installed in series with either an entry wall switch or at a junction box for control of electrical loads in a single room. In another aspect, the injector 101 could be installed at the circuit breaker for a branch circuit serving individual plug-in outlets. In another aspect, the injector 101 could be installed in the AC line conductor entry to a distribution panel 104, if all loads served by that distribution panel 104 are to receive the same load control signals. In yet another aspect, the injector 101 could be installed in the AC line conductor entering the main electrical supply panel for an entire facility, if all electrical loads in that facility are to receive the same load control signals. In this case, the injector 101 would preferably be scaled for a higher current capacity. FIG. 1 shows some of the locations at which the injector 101 could be installed.

The system control 102 is typically wired to the injector 101 in order to regulate the introduction of control signals on the power line. System control 102 can be installed in a number of locations. For example, system control 102 can be installed in a wall-mounted fixture 104 outside the lighting panel as shown in FIG. 1. Alternatively, system control 102 may be installed in the lighting panel near the injector 101. The system control 102 can originate from a number of sources, including, but not limited to: (1) a manual key-switch enabled controller; (2) a programmable time clock; (3) a controller that monitors real-time electric demand, to avoid onerous peak demand excesses; (4) an Ethernet interfaced controller located on the premises; (5) an internet enabled remote control location; or (6) a building wide energy management system.

Preferably, a decoder 103 is installed in each lighting fixture 105 in the lighting branch to interpret the control signals on the AC power line. Although FIG. 1 depicts the decoder 103 as separate from the lighting fixture 105, the decoder 103 can be installed within the lighting fixture 105 itself.

Figure 2:
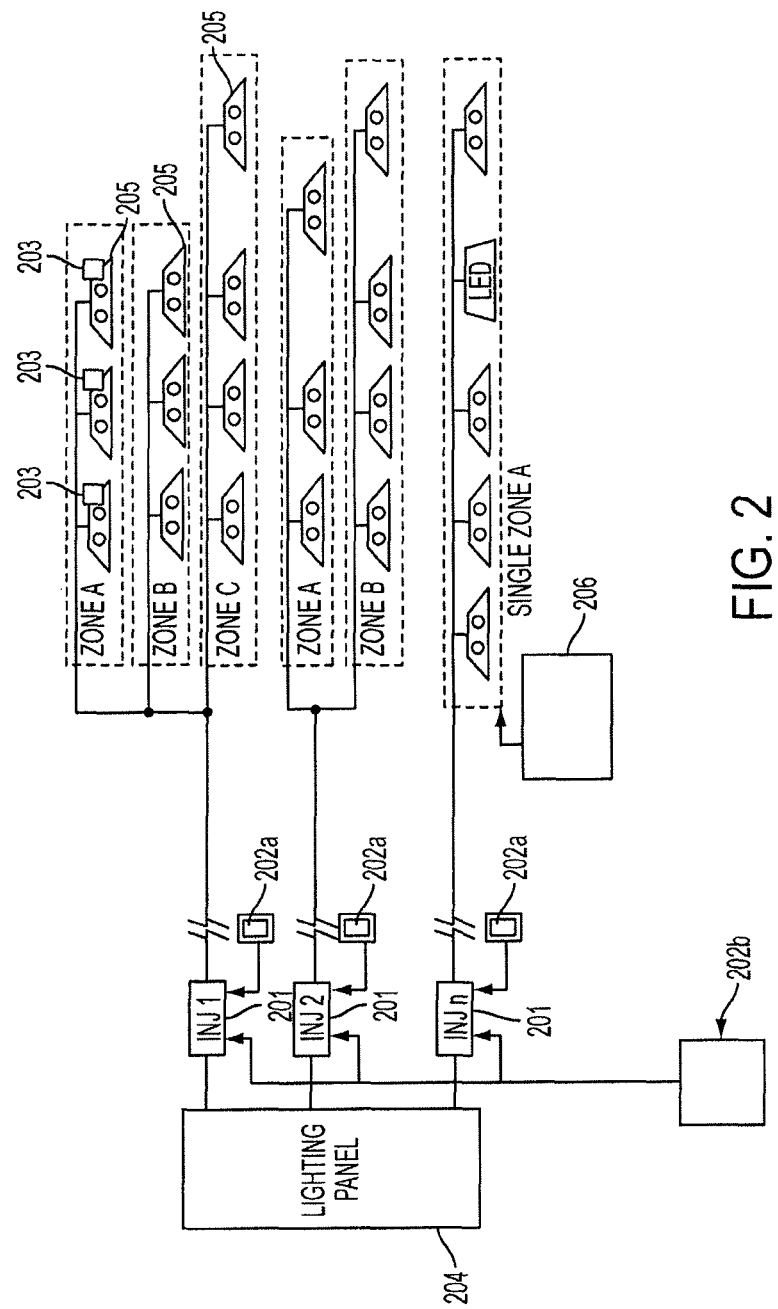
FIG. 2 is a block diagram for installation of the power line communicated load control system in multiple lighting branches.

FIG. 2 shows installation of a PCLC system in a building with multiple lighting branches. Here, an injector 201 is installed for each lighting branch. As discussed above in FIG. 1, the injector 201 is preferably installed in the lighting panel 204, but may be installed in other locations as well. Each injector is fitted with two forms of system control 202a and 202b. System control 202a is a switch installed in a wall-mounted fixture and hard-wired to the injector 201. System control 202b originates from an internet enabled controller. System control 202b can be hard-wired to the injector or it may transmit signals to the injector wirelessly. Although the injectors are being controlled identically in FIG. 2, it may be important to control each lighting branch independently in certain circumstances. It should be appreciated that PCLC can be adapted to function in a way that confines the signaling specifically to each branch, by installing a separate injector in each branch circuit. Because the injector delivers the control signal to only downstream components, no unintentional bleeding of the control signal across neighboring branches can occur.

FIG. 2 depicts a PCLC system where light fixtures 205 are grouped together and provided with an independent occupant control 206. The independent occupant control 206 can be, for example, a wall-mounted light switch located proximal to the light fixtures 205. The independent occupant control connects or disconnects the light fixtures 205 from the branch supply line. When the independent occupant control 206 disconnects the light fixtures 205 from the supply line, no load management controls are needed and the decoder 203 is also disconnected. When the independent occupant control 206 connects the light fixtures to the supply line, the decoders 203 are also connected. This allows decoders 203 to receive command signals on the supply line. Consequently, the PCLC system is able execute load management controls. This is particularly helpful when an occupant forgets to disconnect the light fixtures 205 via the independent occupant control 206.

FIG. 2 also illustrates another important advantage of the PCLC system. That is, PCLC can be adapted to operate with varying types of light fixtures. As shown in FIG. 2, lighting branches often include different types of light fixtures 205. For example, FIG. 2 includes both 0-10 volt analog lighting ballasts as well as LED drivers. PCLC can be adapted to operate with both. In fact, only the decoder needs modification in order to operate with varying types of light fixtures 205. Examples of how the decoder 203 can be modified to operate with different light fixtures will be described below.

Figure 3:
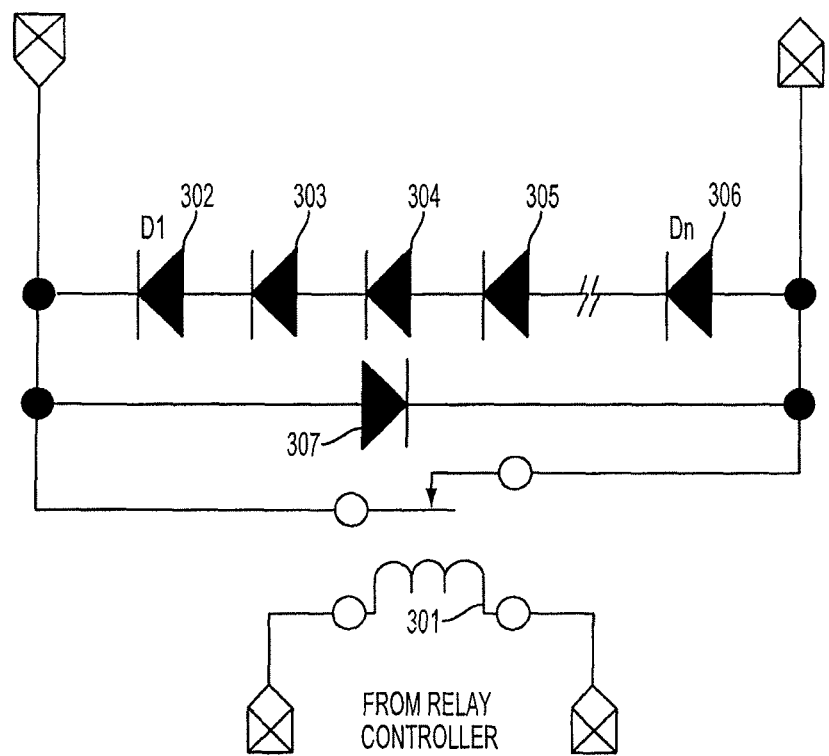
FIG. 3 is a schematic for an injector circuit in accordance with one aspect of the invention.

The injectors 101, 201 described with reference to FIG. 1 and FIG. 2 above can be implemented in a number of ways. FIG. 3 is a schematic for an injector circuit in accordance with one aspect of the invention. This network topography temporarily injects an asymmetrical connection of silicon power diodes 302, 303, 304, 305, 306 in the AC line conductor. An electro-mechanical relay 301 is used to connect the injector circuitry to the AC line conductor. When the relay contacts that shunt the injector circuitry are momentarily opened, an asymmetrical control signal is introduced on the AC line conductor. Power losses will occur only during this brief interval. Otherwise the injector circuitry consumes no electrical power. Although an electro-mechanical relay 301 has been described in this embodiment, the same switching functionality could be obtained with a solid-state relay. Such devices typically employ back-to-back MOSFET or IGBT switching elements, which have very low conduction voltage drops.

The network used in this embodiment has two parallel branches, one branch having multiple series-connected diodes, 302, 303, 304, 305 and 306, to serve as a current path to the load for one direction and the parallel branch having a single diode 307 producing a lower voltage drop to the load for the other polarity of the AC voltage alternation. An alternating current flowing through this network experiences a typical voltage drop of:

$$V = n*0.65\text{-volts (where } N \text{ is the number of diodes in the multiple diode leg)}$$

and a single 0.65 voltage drop in the other direction. The net result is to introduce an approximate (n−1)*0.65-volt average DC component to the supply voltage that is conducted over the lighting supply branch. The DC voltage drop, or voltage offset, is within a range that causes approximately 1% or less total harmonic distortion of the power signal. Preferably, the DC voltage offset is in the range of 1 to 5 volts. 1 to 5 volts is large enough to achieve adequate signaling in the presence of interfering noise without significant power quality depreciation during the signaling intervals.

Silicon diodes are preferred for implementing this embodiment because they are low in cost, readily available, and offer high current ratings. High current ratings are important because all of the current supplied to the downstream loads will flow through this network. For example, a network containing a branch with a 15 ampere lighting load will have to dissipate a momentary loss of several watts. Increasing the number of diodes to increase the DC value of the offset may seem like an attractive design tactic, but doing so will further increase the dissipative loss.

The injector is preferably installed in locations where the power lines are not otherwise corrupted with loads that can produce an extraneous DC voltage offset. Typically, the presence of such loads in most well-engineered buildings would not be acceptable. In any case, the standard installation practice for dedicated load lighting is to separately power the supply branches independently from plug loads and from other machinery. Lighting branch power quality is further enhanced due to the fact that modern electronic ballasts are mandated to include power factor correction circuitry. These factors help isolate the lighting branch from sources of power quality corruption, that could otherwise create interfering noise that might interfere with the encoded control.

Figure 4:
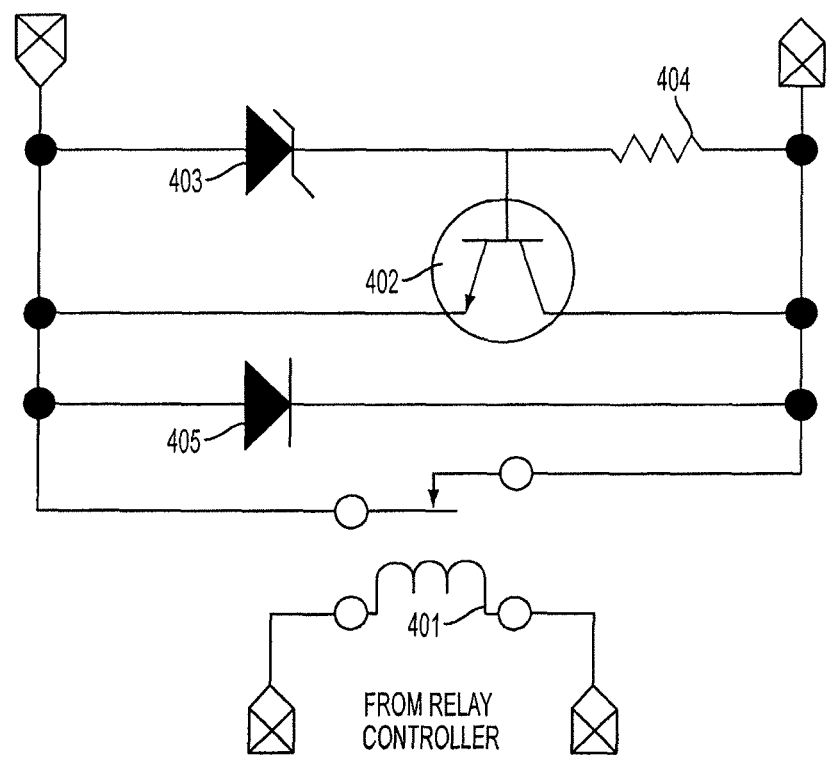
FIG. 4 is a schematic for an injector circuit accordance with an aspect of the invention.

FIG. 4 is a schematic depicting injector circuitry in accordance with another aspect of the invention. An electromechanical relay 401 is used to connect the injector circuitry to the AC line conductor. For this injector circuit, the branch containing multiple power diodes is replaced with a junction transistor 402 having its base controlled by a low power Zener diode 403 and a resistor 404. A diode 405 is still preferably used to produce a lower voltage drop in the polarity opposite of that produced by the junction transistor 402. This circuit configuration conveniently consolidates all the power losses of the multiple-drop branch into a single readily available junction transistor 402. Here, the Zener diode 403 current is only a fraction of the load current, since it is effectively multiplied by the current gain of the junction transistor 402. Although a junction transistor 402 is illustrated, either a MOSFET or IGBT could be employed to provide the active current gain required for the operation of the circuit. This embodiment is beneficial because it tends to be a more cost-effective option.

Similar to the embodiment depicted in FIG. 1, an electromechanical relay 401 is used to connect the injector circuitry to the AC line conductor. Although an electro-mechanical relay has been described in this embodiment, the same switching functionality could be obtained with a solid-state relay. Such devices typically employ back-to-back MOSFET or IGBT switching elements, which have very low conduction voltage drops.

Figure 5:
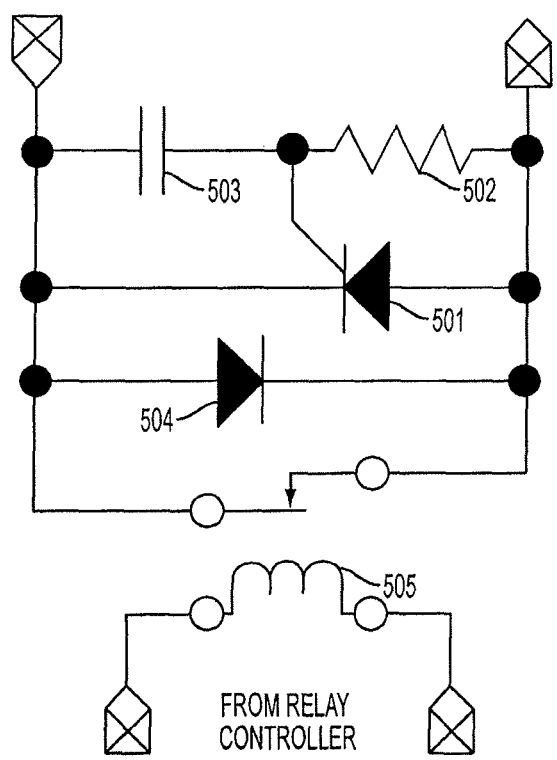
FIG. 5 is a schematic for an injector circuit in accordance with an aspect of the invention.

FIG. 5 is a schematic for an injector in accordance with another aspect of the invention. An electro-mechanical relay 505 is used to connect the injector circuitry to the AC line conductor. For the injector circuit depicted in FIG. 5, a silicon controlled rectifier (SCR) or a bidirectional triode thyristor (TRIAC) 501 is used to provide a unidirectional voltage drop. A diode 504 is preferably used to produce a lower voltage drop in the polarity opposite of that produced by the TRIAC or SCR 501. The network consisting of resistor 502 and capacitor 503 provides excitation for the silicon controlled rectifier's 501 gate to trigger conduction, and imposes a slight phase delay. This delay reduces the unidirectional conduction angle, thus producing the desired DC offset. This embodiment is an attractive option because it contains widely available components in the appropriate voltage and current ratings.

Figure 6:
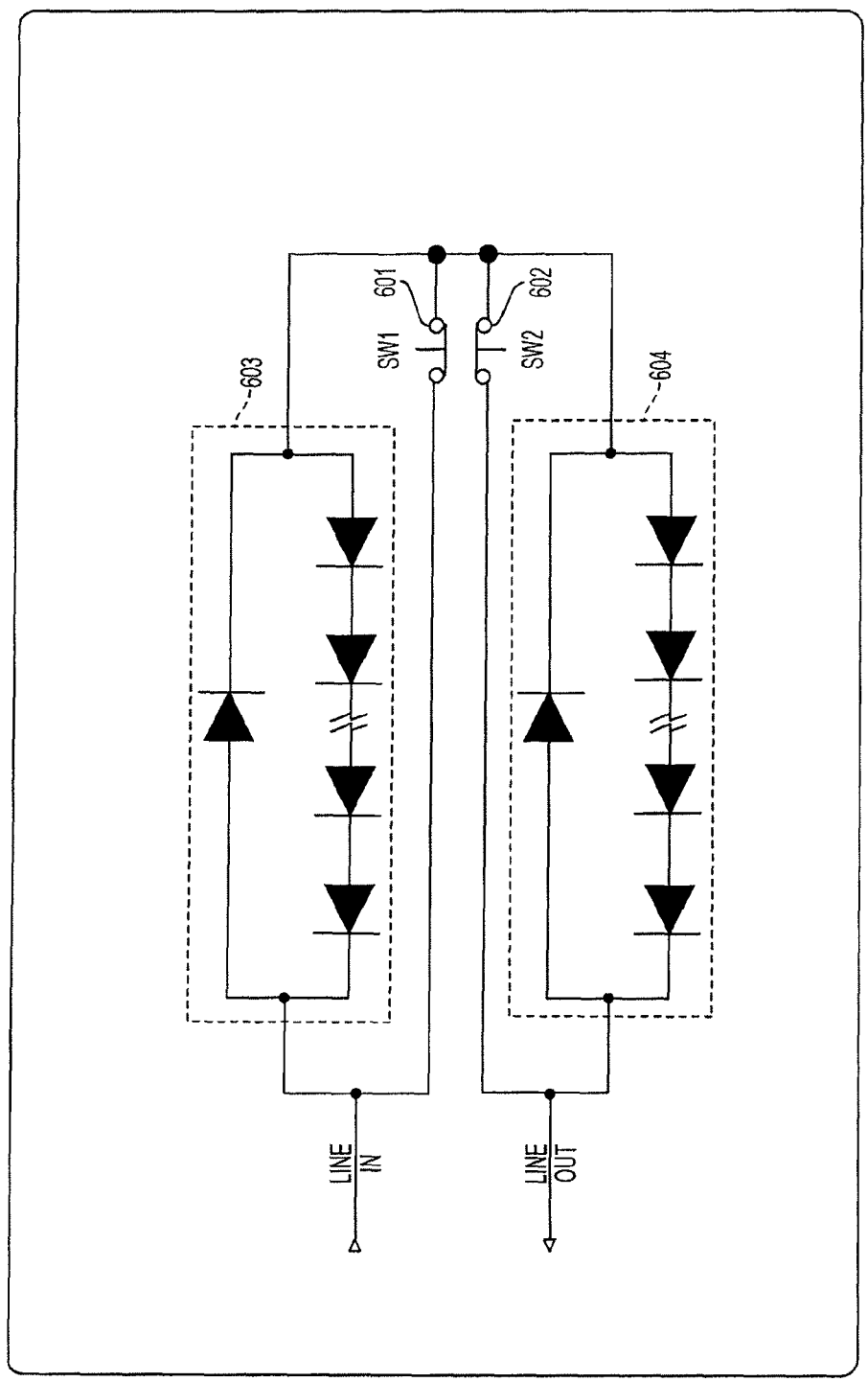
FIG. 6 is a schematic for an injector circuit in accordance with an exemplary embodiment.

FIG. 6 is a schematic for an injector in accordance with yet another aspect of the invention. This injector circuit is comprised of not one, but two asymmetrical diode networks. Diode network 603 is configured to produce an average voltage offset in one polarity, while diode network 604 is configured to produce an average voltage offset in the opposite polarity. Each of the asymmetrical networks is shunted by a normally closed switch 601, 602. If switch 601 is momentarily opened, an average voltage offset of the appropriate polarity will be produced at the line out terminal during the actuation interval. Alternatively, if switch 602 is momentarily operated, an offset of the opposite polarity will result during the actuation interval. This injector configuration is referred to as a bi-polar injector. It may be applied in circumstances where complicated encoding is not desired. For example, this embodiment could be applied to produce a rudimentary "dim up" and "dim down" wall control without the needing a complex system control.

Figure 7:
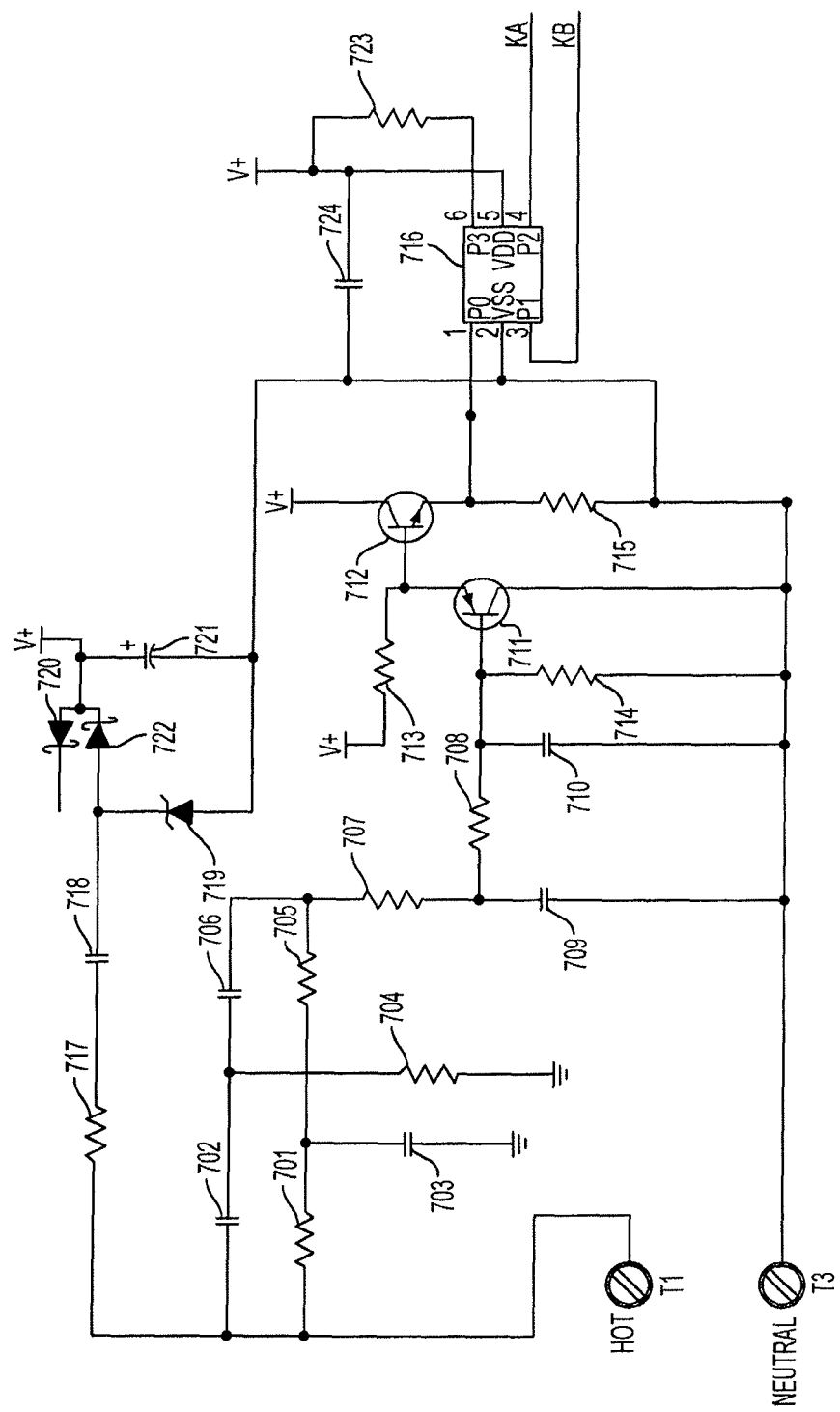
FIG. 7 is a schematic for a decoder circuit in accordance with an aspect of the invention.

The decoders 103, 203 described with reference to FIG. 1 and FIG. 2 above can also be implemented in a number of ways. FIG. 7 is a schematic for a decoder used to detect the presence of control signals on an AC power line in accordance with an exemplary embodiment.

The decoder in FIG. 7 utilizes an initial "Twin Tee" notch filter to attenuate the 60 (or 50) Hz power line frequency component. The notch filter is comprised of capacitors 702, 703 and 706, as well as resistors 701, 705 and 704. The "Twin Tee" notch filter is followed by a 2-pole low pass filter to further enhance detection of control signals in the form of momentary intervals of DC offset on the powerline. The 2-pole low pass filter is comprised of resistors 707 and 708 and capacitors 709 and 710. Transistor inverters 711 and 712 combined with resistors 713, 714 and 715 perform impedance transformation and level shifting functions. Resistor 717, diodes 719, 720 and 722, and capacitors 718 and 721 serve as an energy-efficient, transformer-less, low-current power supply. Resistor 723 limits current to microprocessor 716 pin 6, and capacitor 724 filters high frequency noise. Once the passive filtering described above has extracted the low-frequency data waveform in from the powerline, the signal is presented to microprocessor 716. Microprocessor 716 performs several functions, one of which is an adaptive level slicing demodulation function. This function can be used to extract the control information on the powerline.

Figure 8:
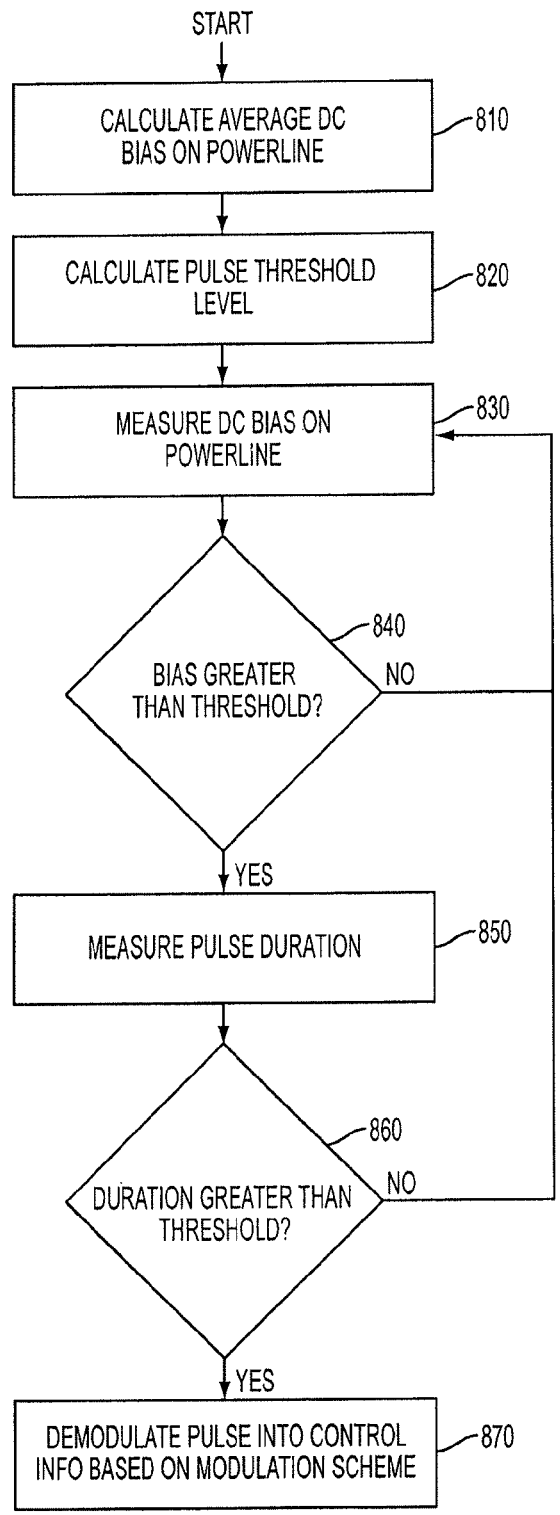
FIG. 8 is a flow chart showing a method for decoding control signals on a powerline in accordance with the disclosed principles.

FIG. 8 shows a method that can be used by microprocessor 716 to decode control signals on the powerline. The method begins by calculating the average DC bias component on the powerline when no control signal is present (step 810). From this average, a pulse threshold is determined (step 820). The pulse threshold may be, for example, the average value between the amplitude of a control signal pulse and the average DC bias component calculated in step 810. Averaging the threshold value in this manner provides a reliable way in which to determine a threshold value above the background noise level. Once the pulse threshold has been calculated, the microprocessor can then monitor the DC bias present on the powerline in order to detect control pulses (step 830). If the microprocessor 716 detects a pulse signal greater than the threshold value (step 840), the microprocessor 716 will then measure the duration of that pulse (step 850). Once the duration of the pulse signal has been determined, the microprocessor 716 will compare the pulse duration measurement to a predetermined pulse duration threshold (step 860). If the pulse duration exceeds the pulse duration threshold value, the microprocessor 716 will demodulate the pulse signal into control information based on the selected modulation scheme for the PCLC system.

It should be appreciated that the control information can be modulated in a number of ways. For example, the control information could be modulated in a two-state scheme or a multi-level scheme. Two-state schemes are used for basic on/off functionality. In a two-state scheme, any pulse that has a duration longer than a predetermined value, for example 500 ms, is considered an "off" signal, while any pulse shorter than the predetermined value—but still longer than the pulse duration threshold—is considered an "on" signal. A two-state scheme could also be implemented where longer pulses are "on" signals and shorter pulses are "off" signals. A multi-level scheme preferably uses pulses of a fixed width, for example 200 ms, and varies the time between the pulses to send multiple bits of binary data. The number of discernable time periods between pulses represents the number of bits of data being sent.

Figure 9:
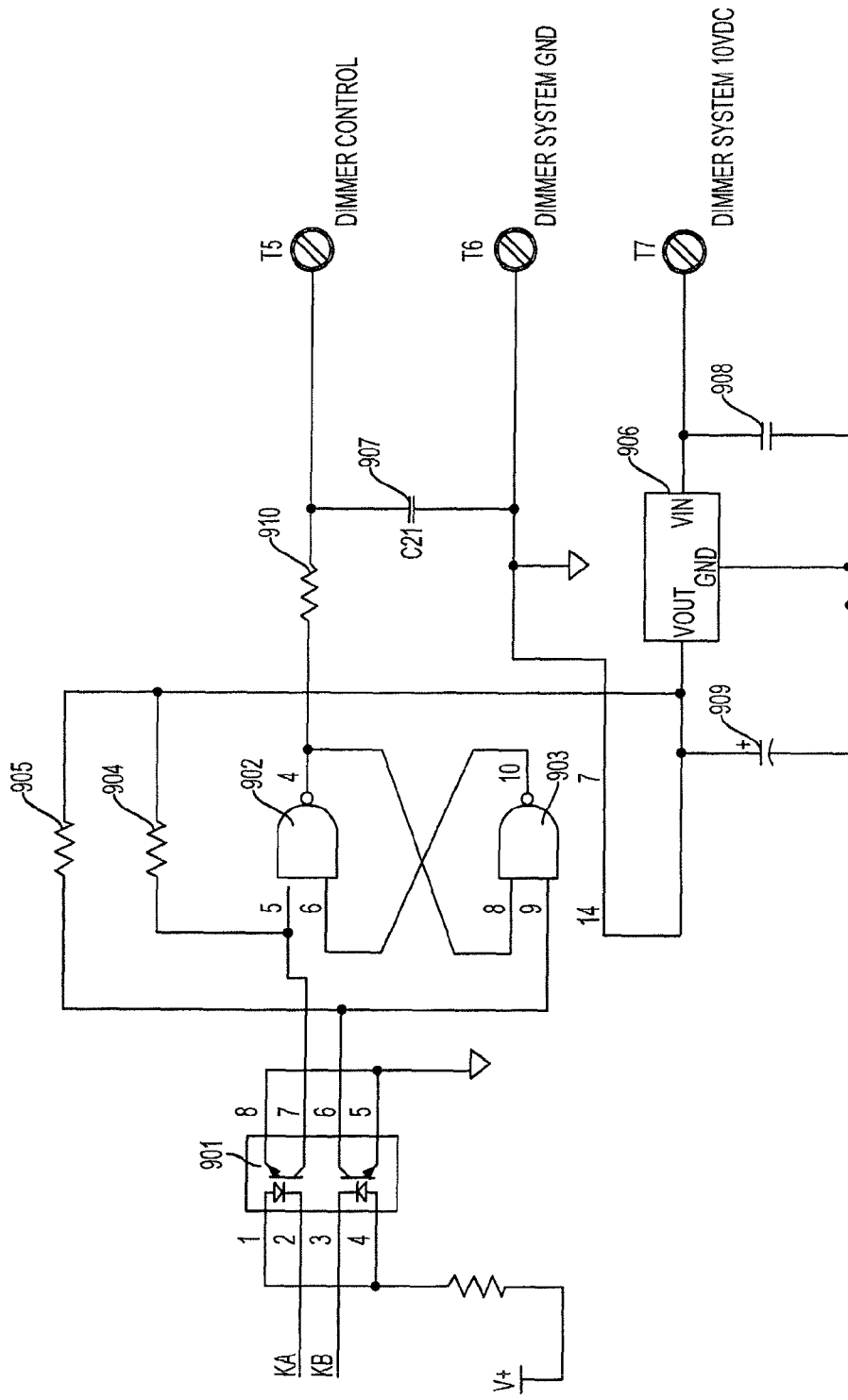
FIG. 9 is a schematic for an isolation interface for a decoder circuit in accordance with the disclosed principles.

It is important that the decoder circuit be capable of certification for listing by Underwriters Laboratories® (UL) and other international safety organizations. Thus, the output from the decoder circuit is preferably isolated from the powerline. FIG. 9 shows an isolation circuit used to isolate the decoder output from the powerline in accordance with on aspect of the invention. The output from pins 3 and 4 of microprocessor 716 are fed to optocoupler 901, which provides the necessary isolation. In turn, optocoupler 901 is connected to a set-reset flip-flop gate created by logic gates 902 and 903 and resistors 904 and 905. Resistor 910 and capacitor 907 filter noise from the set-reset flip-flop output. Based upon output from the optocoupler, the set-reset flip-flop gate sends short, low-power trigger pulses to produce a low frequency, pulse-width-modulated source for the dimming control signal. The dimming control signal is connected to the dimming control in the light fixture. Voltage regulator 906 is used to step down the supply voltage from the light fixture in order to power the set-reset flip-flop gate. Capacitors 908 and 909 filter noise from the voltage regulator circuit. This galvanic barrier circuitry is powered from an isolated source of voltage in the fluorescent ballast or LED driver to which it is connected.

The decoder is designed to operate with a number of well-known lighting fixtures. For instance, remote control of low voltage LED loads is easily accomplished with PCLC technology. The drivers used to energize LED loads conveniently have low voltage outputs that can serve to power a decoder as well as the LED load. This is not only cost-effective, but it also simplifies the complexity of UL/CEO certification. Several different possible arrangements are presented that are applicable to commercial LED drivers that incorporate either constant current or constant voltage output regulation. In the case of constant voltage, dimming functionality can be added to a driver that does not otherwise have dimming functionality. An external pulse width modulation ("PWM") switch interrupts a variable percentage of the drive current in order to dim the LED load. Either continuous or multi-step dimming is possible with the same hardware configuration, differing only by the decoder's microprocessor firmware. Constant current drivers must include a dimming function if they are to be controlled by a decoder. Dimming constant current drivers often use a PWM digital input that is used to change the duty cycle of the current source located within the driver circuitry.

Figure 10:
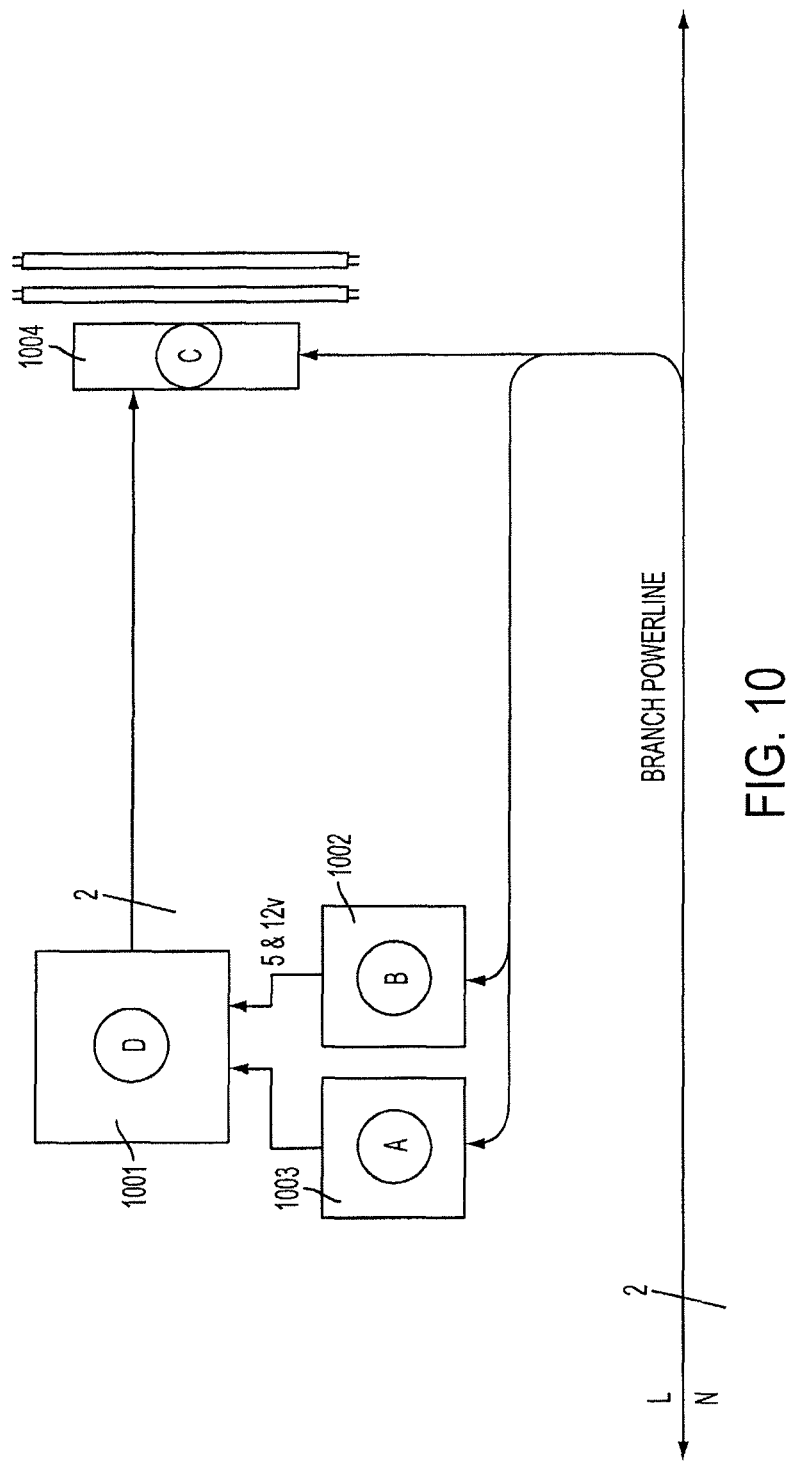
FIG. 10 is a block diagram for adapting PCLC to a light fixture having a 0-10 volt analog ballast or voltage-controlled dimming LED driver.

FIG. 10 is a block diagram for a configuration for adapting PCLC to a light fixture using a 0-10 volt analog ballast or voltage-controlled dimming LED driver. In this configuration, the decoder includes a microprocessor 1001, a voltage regulator 1002 and an isolated line interface 1003. The line interface 1003 is configured to isolate the microprocessor 1001 from the powerline. The voltage regulator 1002 included in this configuration is also isolated from the power line in order to meet UL® certification standards. Here, the microprocessor 1001 supplies a 0-10 volt output that can be used to control devices that lack an internal current source 1004, such as a fluorescent light. This configuration can produce either multiple step or continuous load control, depending on the firmware loaded into the microprocessor 1001. This configuration has no artificial lower limits to its control range. It is able to take advantage of the full control range (e.g. 5-100%) of the load to which it is connected.

Figure 11:
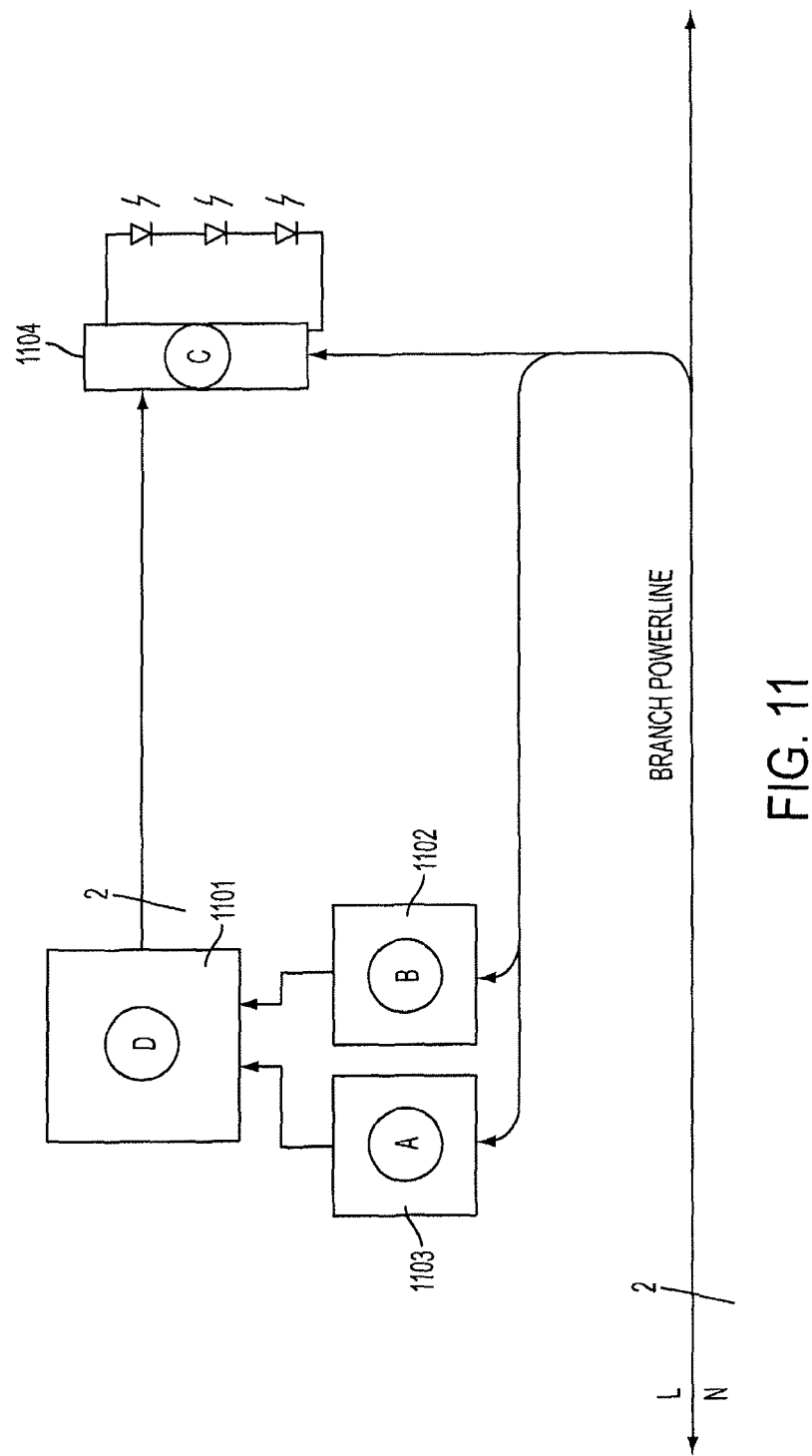
FIG. 11 is a block diagram for adapting PCLC to a light fixture having a PWM controlled dimming LED driver or current control.

FIG. 11 is a block diagram for installing a decoder in a lighting fixture that utilizes a PWM controlled dimming LED driver or current control. In this configuration, the decoder includes a microprocessor 1101, an isolated line interface 1103 and a voltage regulator 1102. The isolated line interface 1103 isolates the microprocessor 1101 from the powerline. The voltage regulator 1102 is also isolated from the powerline order to meet UL® certification standards. The microprocessor 1101 produces a variable duty-cycle PWM signal that controls the LED 1104 intensity. It results in continuous or step-incremented changes in the luminous output of the controlled LEDs 1104. Typically, the frequency of the PWM control signal is 100 to 500 hertz to minimize perceptible flicker and stroboscopic effects.

Figure 12:
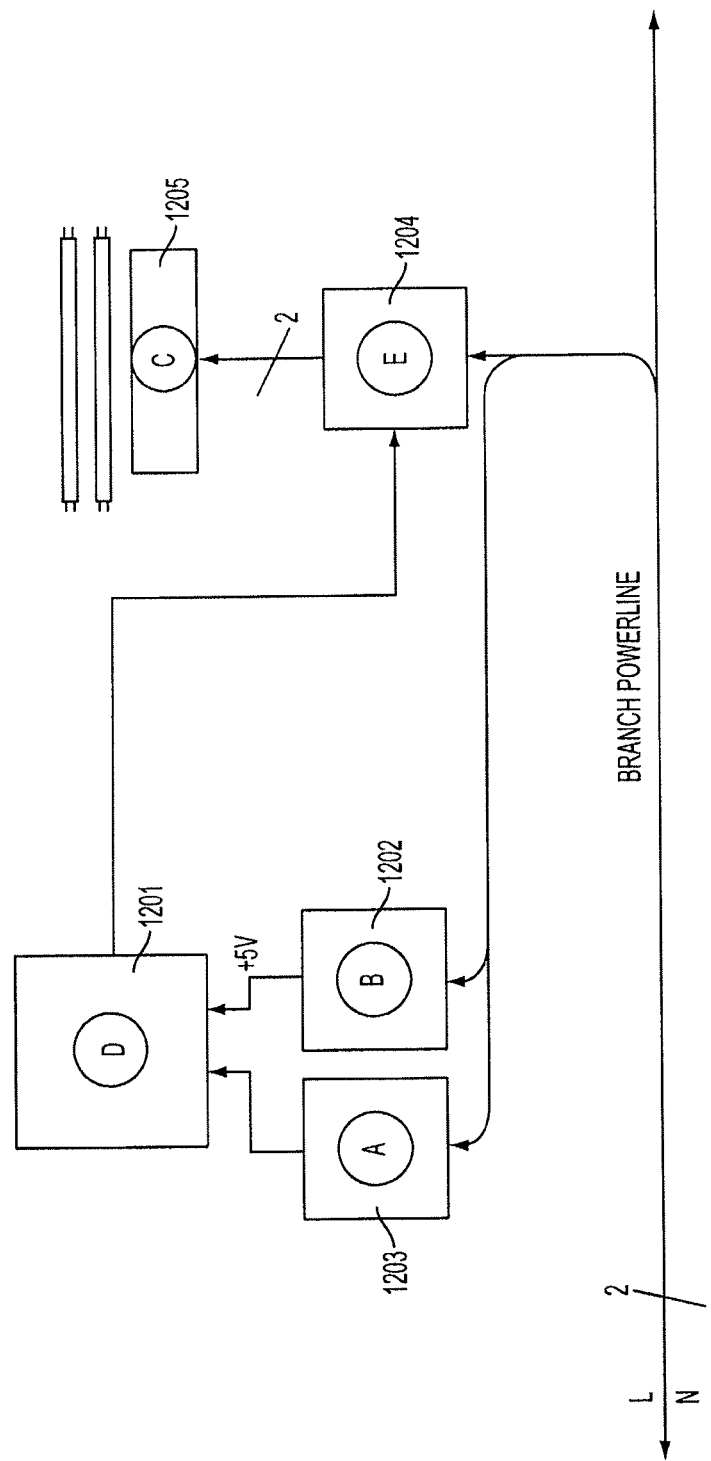
FIG. 12 is a block diagram for adapting PCLC to a light fixture having a two-wire dimming fluorescent ballast.

The decoder can also be configured to operate with light fixtures using two-wire dimming fluorescent ballasts. These ballasts have become a popular choice for retrofit applications because they offer the ability to add dimming control over existing power wiring. They also operate with many standard wall dimmer controls in a way that is familiar to both occupants and the installation trades. Similarly, it appears that the same type of dimmer controls are finding wider acceptance for the emerging application of LED dimming. In some instances, it may be desirable to have a few 2-wire dimming loads fed by a branch circuit that also serves non-dimming loads. FIG. 12 is a block diagram illustrating how PCLC can be adapted to mixed load, two-wire dimming ballasts.

The decoder configuration in FIG. 12 includes a microprocessor 1201, a voltage regulator 1202, and a line interface 1203. The voltage regulator receives power from the branch supply line. Line interface 1203 ensures that the decoder is isolated from the power line for certification purposes. The microprocessor 1201 receives control signals sent on the power line, and decodes them into the appropriate load management controls. The microprocessor then controls the TRIAC dimmer 1204 which limits power to the controlled load 1205.

In addition to two-wire dimming ballasts, the decoder can also be adapted to operate with three-wire dimming ballasts. In its normal application, the third wire of three-wire dimming ballasts emanates from a conventional phase-cut wall dimmer that is connected in tandem to each controlled load. This third wire carries only dimming information but not the excitation for the ballast. This reduces the amount of power quality degradation that is introduced from the dimmed load and permits dimming down to very low levels. Instead of using a third wire for dimming commands, PCLC recovers the commands sent over the power line, as shown in FIG. 13.

Figure 13:
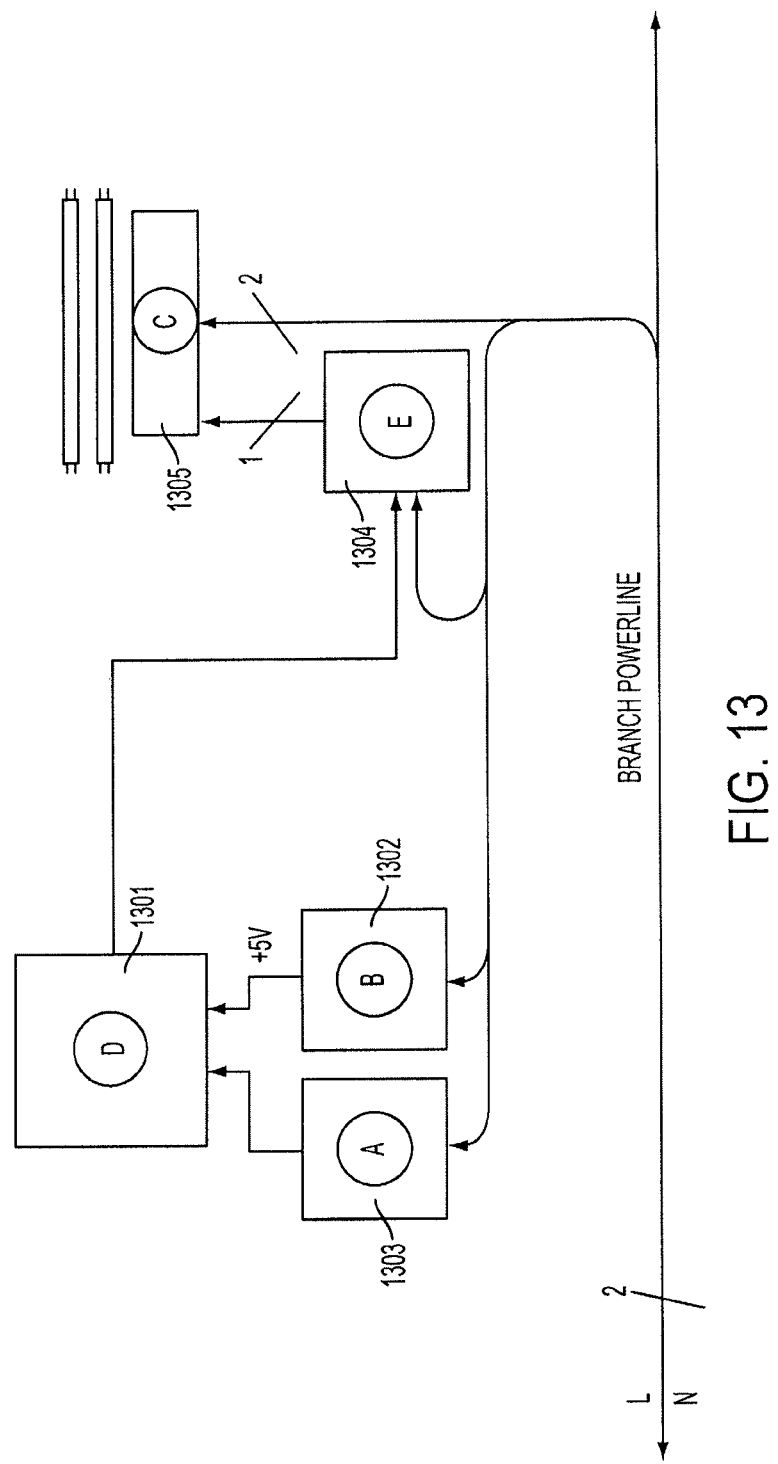
FIG. 13 is a block diagram for adapting PCLC to a light fixture configured to operate with a three-wire dimming control.

The decoder configuration in FIG. 13 is very similar to the decoder configuration of FIG. 12. It consists of a microprocessor 1301, a voltage regulator 1302, and a line interface 1303. Here, the decoder configuration replaces a conventional phase-cut wall dimmer that is connected in tandem the load. The voltage regulator receives power from the branch supply line. Line interface 1303 ensures that the decoder is isolated from the power line for certification purposes. The microprocessor 1301 receives control signals sent on the power line, as opposed to signals coming from the phase-cut wall dimmer, and decodes them into the appropriate load management controls. The microprocessor controls operation of the TRIAC dimmer 1304 used to control the load 1305.

Figure 14:
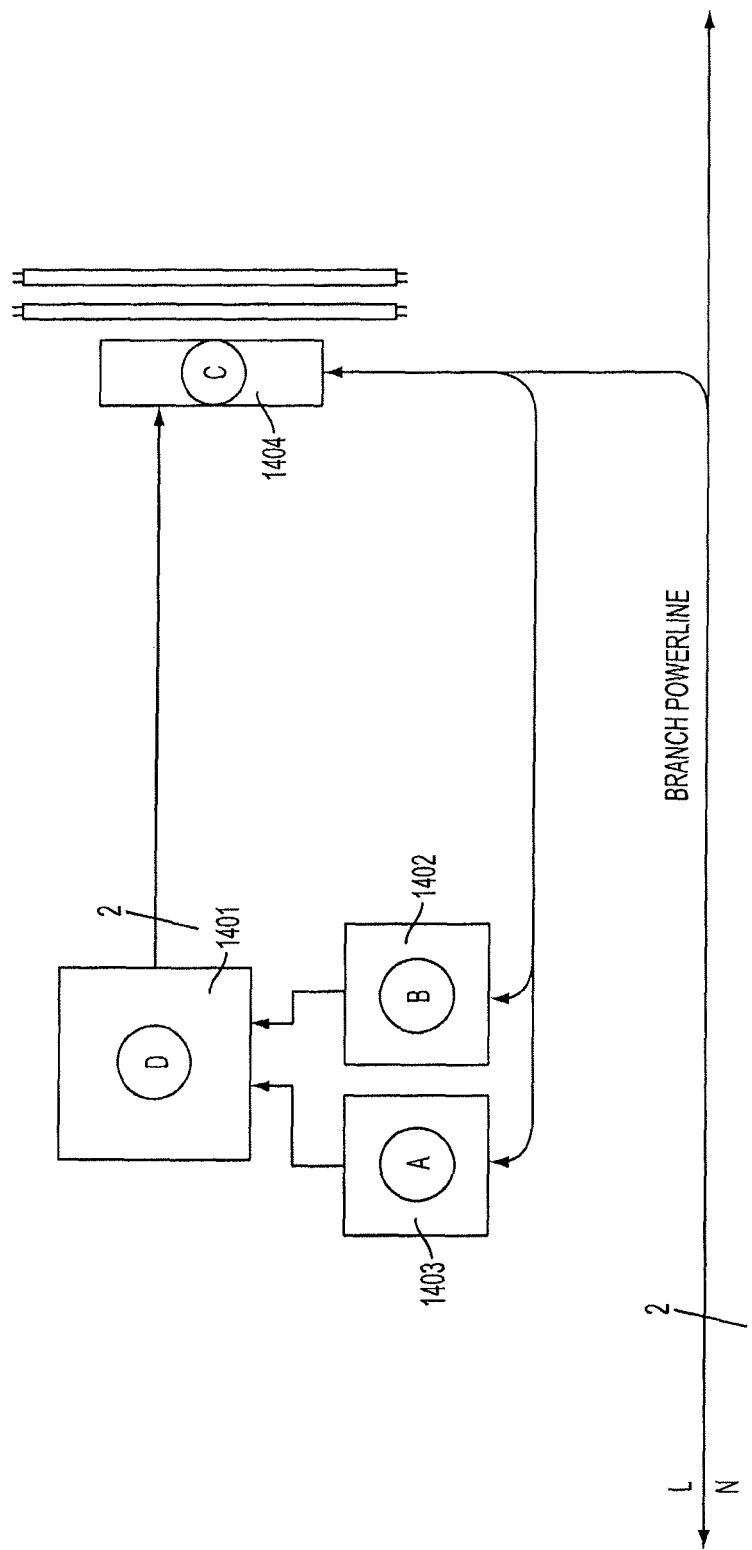
FIG. 14 is a block diagram for adapting PCLC to a light fixture configured to operate with a DALI dimming control.

PCLC can also be adapted for use in ballasts or drivers implementing a Digital Addressable Lighting Interface ("DALI"). FIG. 14 is a block diagram for a decoder configured to operate with a light fixture that is equipped with a DALI control input. This configuration consists of a microprocessor 1401 programmed with specific DALI commands, a switching universal voltage supply 1402, and a line interface 1403. Typically, this variety of control would be used in an addressable network spanning a large number of independent zones. However, in a non-networked application, only one ballast or driver is being controlled. Consequently, the decoder can take advantage of a special DALI routine, designated as "broadcast mode." This routine transmits commands that are directed to any connected ballast or driver, regardless of its address setting. These commands are transmitted in a simplex mode, which does not require the return of an acknowledgement.

Because DALI commands transmitted in "broadcast mode" do not require a return acknowledgement, the microprocessor 1401 can receive the commands and convert them into dimming commands for light fixture. Preferably, the microprocessor 1401 has a random access memory with a sequence of permanently coded DALI commands representing the graduated range of dimming commands. The microprocessor 1401 sends the appropriate command to the load with the DALI control input 1404. It is even possible to implement on/off functionality in this configuration by using the lowest dimming level to turn off the load. PCLC adapted to operate with a light fixture having a DALI control input is capable of producing the largest (and most apparent) incremental reduction in a managed load.

The decoder for this embodiment may be designed to utilize either solid-state (wet contact) or electro-mechanical (dry contact) load relay switches. In the electro-mechanical relay case, either pulse-actuated or continuously energized types can be employed. Pulse actuated relays are considered preferable from an energy conservation basis, due to the fact that they consume power only when changing switching state. Solid-state relays may also be used. Their relatively low holding currents make them efficient from an energy loss standpoint. The random phase switching variety of solid-state relay is preferable because it does not exhibit triggering anomalies due to holding current complications.

With the above, a system and method for controlling electrical loads over an AC powerline is provided.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that the present invention be limited only by the claims and the equivalents thereof.

What is claimed is:

1. A system for transmitting communication signals, the system comprising:
    an injector circuit connected, in series, between a powered circuit conductor and a decoder, the injector circuit configured to modulate, in series, an AC power signal with a time sequence of instantaneous DC voltage offsets over at least a portion of a voltage phase to produce one or more bits to be transmitted on the powered circuit conductor, wherein the one or more bits form a command, wherein the AC power signal is modulated with respect to ground/neutral used by AC voltage, and wherein modulating the AC power signal includes varying one or more properties of a periodic waveform by subtracting a magnitude of the DC voltage offsets from a magnitude of the AC voltage; and
    the decoder connected to the powered circuit conductor and configured to be connected to a load, the decoder further configured to demodulate the instantaneous DC voltage offsets to extract the command to control the load based on a selected control scheme.

2. The system of claim 1, wherein the instantaneous DC voltage offset is within the range of approximately 1 to 5 volts.

3. The system of claim 1, further comprising a system control module in communication with the injector circuit, the system control module configured to open a short across the injector circuit to allow the injector circuit to modulate the AC power signal by subtracting the magnitude of the DC voltage offsets from the magnitude of the AC voltage, and further configured to short across the injector circuit in the powered circuit conductor while modulation does not occur.

4. The system of claim 3, wherein the system control module is wirelessly connected to the injector circuit.

5. The system of claim 3, wherein the modulation scheme is a two-state scheme.

6. The system of claim 3, wherein the modulation scheme is a multi-level scheme.

7. The system of claim 1, wherein the injector circuit is an asymmetrical network.

8. The system of claim 7, wherein the asymmetrical network modulates the AC power signal with the instantaneous DC voltage offset, the instantaneous DC voltage offset having a first voltage offset for modulating a first polarity of the AC power signal and a second voltage offset for modulating a second polarity of the AC power signal, the first voltage offset being different than the second voltage offset.

9. The system of claim 8, wherein the asymmetrical network comprises a transistor configured to produce the first voltage offset in the first polarity; and a diode configured to produce the second voltage offset in the second polarity.

10. The system of claim 8, wherein the asymmetrical network comprises a rectifier circuit configured to produce the first voltage offset in the first polarity; and a diode configured to produce the second voltage offset in the second polarity.

11. The system of claim 1, wherein the injector circuit includes a first asymmetrical network and a second asymmetrical network.

12. The system of claim 1, further comprising an isolation interface configured to provide galvanic isolation between the powered circuit conductor and the decoder.

13. The system of claim 1, wherein the decoder includes a microprocessor configured to demodulate the DC voltage offset to control the load.

14. The system of claim 13, wherein the microprocessor is configured to demodulate the instantaneous DC voltage offset on the powered circuit conductor by calculating an average instantaneous DC voltage offset of the AC power signal, measuring an instantaneous DC voltage offset of the AC power signal, comparing the instantaneous DC voltage offset of the AC power signal to the average instantaneous DC voltage offset of the AC power signal, and converting the instantaneous DC voltage offset of the AC power signal to a control signal for controlling the load when the instantaneous DC voltage offset of the AC power signal is greater than the average instantaneous DC voltage offset of the AC power signal.

15. A method for transmitting communication signals, the method comprising:
  modulating, in series, an AC power signal on a powered circuit conductor with a time sequence of instantaneous DC voltage offsets over at least a portion of a voltage phase to produce one or more bits to be transmitted on the powered circuit conductor, wherein the one or more bits form a command, wherein the AC power signal is modulated with respect to ground/neutral used by AC voltage, and wherein modulating the AC power signal includes varying one or more properties of a periodic waveform by subtracting a magnitude of the DC voltage offsets from a magnitude of the AC voltage; and
  demodulating the instantaneous DC voltage offsets to extract the command to control a load.

16. The method of claim 15, wherein the instantaneous DC voltage offset is within the range of approximately 1 to 5 volts.

17. The method of claim 15, further comprising modulating the AC power signal in a pulse pattern.

18. The method of claim 15, further comprising opening a short to allow modulation of the AC power signal, and shorting across the powered circuit conductor while modulation does not occur.

19. The method of claim 18, wherein the modulation scheme is a two-state scheme.

20. The method of claim 18, wherein the modulation scheme is a multi-level scheme.

21. The method of claim 15, further comprising providing galvanic isolation from the powered circuit conductor.

22. The method of claim 15, wherein demodulating the instantaneous DC voltage offsets to control the load comprises:
  calculating an average instantaneous DC voltage offset of the AC power signal;
  measuring an instantaneous DC voltage offset of the AC power signal;
  comparing the instantaneous DC voltage offset of the AC power signal to the average instantaneous DC voltage offset of the AC power signal; and
  converting the instantaneous DC voltage offset of the AC power signal to a control signal for controlling the load when the instantaneous DC voltage offset of the AC power signal is greater than the average instantaneous DC voltage offset of the AC power signal.

* * * * *